United States Patent
Zamyatin (10) Patent No.: US 10,636,128 B2
(45) Date of Patent: Apr. 28, 2020

(54) RECURSIVE FILTER FOR SPACE-VARIANT IMAGES

(71) Applicant: ANALOGIC CORPORATION, Peabody, MA (US)

(72) Inventor: Alexander Zamyatin, Mayfield Heights, OH (US)

(73) Assignee: Analogic Corporation, Peabody, MA (US)

( * ) Notice: Subject to any disclaimer, the term of this patent is extended or adjusted under 35 U.S.C. 154(b) by 70 days.

(21) Appl. No.: 16/010,666

(22) Filed: Jun. 18, 2018

(65) Prior Publication Data

US 2019/0385289 A1    Dec. 19, 2019

(51) Int. Cl.
*G06T 5/20* (2006.01)
*G06T 7/00* (2017.01)

(52) U.S. Cl.
CPC .............. *G06T 5/20* (2013.01); *G06T 7/0012* (2013.01)

(58) Field of Classification Search
CPC ................................ G06T 7/0012; G06T 5/20
See application file for complete search history.

(56) References Cited

U.S. PATENT DOCUMENTS

| | | | |
|---|---|---|---|
| 2014/0029819 A1* | 1/2014 | Zeng | G06T 11/003 382/131 |
| 2015/0178970 A1* | 6/2015 | Pham | G06T 5/002 382/190 |
| 2015/0348239 A1* | 12/2015 | Nestares | H04N 5/247 382/255 |

* cited by examiner

*Primary Examiner* — King Y Poon
*Assistant Examiner* — Michael Burleson
(74) *Attorney, Agent, or Firm* — TraskBritt (57) ABSTRACT

Provided are one or more systems and/or techniques for filtering noise from a space-variant image. For each of the plurality of pixels included in the space-variant image, a variance of the pixel is detected, and a variance reduction power is generated based on a relationship between the detected variance of the pixel and a target variance specified by a user. At least a first defined kernel is selected from a database populated with a plurality of defined kernels that are available to be selected for filtering the image data for the pixel. The image data for the pixel is recursively filtered during a plurality of filter iterations to cause the variance of the pixel to approach the target variance. The first defined kernel is applied to the image data for the pixel during at least one of the filter iterations.

20 Claims, 5 Drawing Sheets

RECURSIVE FILTER FOR SPACE-VARIANT IMAGES

BACKGROUND

The present application relates to the field of image filters and, more specifically, to a recursive filter that recursively applies one or more pre-computed filter kernels selected from a database to individual regions of an image, thereby achieving a desired variance reduction at those individual regions.

Conventional image filtering techniques require the calculation of the filter parameters for the data specific to each individual pixel used to display an image, on the fly. For example, filters often employ a kernel, also referred to as a mask, which is a square matrix of values called kernel elements. The kernel is figuratively overlaid onto image data for a similarly-sized neighborhood of pixels used to display a portion of the image, including the pixel currently being analyzed. Performing a mathematical convolution of the kernel with the data for the neighborhood of pixels overlaid by the kernel results in a filtered value of the pixel currently being analyzed. This process is repeated to filter the image data for each individual pixel that is to form a portion of the filtered image.

Calculations of the kernel dimension and the values of the kernel elements on the fly have conventionally been performed specifically for each individual pixel, during the analysis of each individual pixel to determine the extent of filtration to be applied. The strength of a filter, or the extent to which noise or another artifact is to be filtered, depends in large part to the dimension of the filter's kernel. Pixel data that requires a relatively-strong filter to limit the presence of a substantial artifact is conventionally filtered using large kernels having many rows and columns. However, the number of computations for a given pixel increases as the square of the kernel's size. Thus, use of a large kernel for pixels requiring a relatively-strong filter involves many complex calculations, which consumes significant computer processing resources, making conventional filtering techniques slow and impractical for very noisy images. As a result, the extent of filtering that can be performed according to such conventional techniques is often limited by a maximum permissible size of the kernel that can be utilized. Such computationally-demanding filtering techniques are also often not suitable to be performed utilizing a parallel computing architecture.

Recursive filters were developed in an effort to at least partially address the computationally-intensive nature of conventional filters. Recursive filters utilize a first filtered output as an input to another filter. However, conventional recursive filters require the use of both causal filters and anti-causal filters, with the result of each filter being combined. As a result, both forward and backward recursions are necessary, and large amounts of computer memory are required to store both conversion results that are to be combined in the final result.

SUMMARY

Aspects of the present application address at least some of the above matters, and possibly others. According to one aspect a method of filtering a space-variant image is provided. The method includes receiving, at an image filter module, image data for the space-variant image and a target variance specified by a user. The target variance establishes a filtered variance desired by the user to be exhibited by each of a plurality of pixels included in the space-variant image as a result of being filtered. With the image filter module, for each of the plurality of pixels included in the space-variant image: (i) a variance of the pixel is detected, wherein the detected variance indicates a deviation of the image data for the pixel from a threshold; (ii) a variance reduction power is generated based on a relationship between the detected variance of the pixel and the target variance specified by the user; (iii) at least a first defined kernel is selected from a database populated with a plurality of defined kernels that are available to be selected for filtering the image data for the pixel; and (iv) the image data for the pixel is recursively filtered during a plurality of filter iterations to cause the variance of the pixel to approach the target variance, wherein at least one of the filter iterations comprises applying the first defined kernel to the image data for the pixel.

According to another aspect, a non-transitory computer-readable medium and a computing system for executing instructions on the non-transitory computer-readable medium are provided. The non-transitory computer-readable medium includes computer-executable instructions that, when executed by at least one computer processor, cause the computing system comprising an image filter module to filter a space-variant image and create a substantially uniform variance across a plurality of pixels collectively forming the space-variant image is provided. The operations include receiving image data for the space-variant image and a target variance specified by a user. The target variance establishes a filtered variance desired by the user to be exhibited by each of a plurality of pixels included in the space-variant image as a result of being filtered. With the image filter module, for each of the plurality of pixels included in the space-variant image, the operations also include: (i) detecting a variance of the pixel, wherein the detected variance indicates a deviation of the image data for the pixel from a threshold; (ii) generating a variance reduction power based on a relationship between the detected variance of the pixel and the target variance specified by the user; (iii) selecting at least a first defined kernel from a database populated with a plurality of defined kernels that are available to be selected for filtering the image data for the pixel; and (iv) recursively filtering the image data for the pixel during a plurality of filter iterations to cause the variance of the pixel to approach the target variance. At least one of the filter iterations includes applying the first defined kernel to the image data for the pixel.

Those of ordinary skill in the art may appreciate still other aspects of the present application upon reading and understanding the appended description.

FIGURES

The application is illustrated by way of example and not limitation in the figures of the accompanying drawings, in which like references generally indicate similar elements and in which.

DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Among other things, one or more systems and/or techniques for filtering image data for a space-variant image are provided herein. Space-variant image filtering involves varying the filter kernel according to the position of the pixels in the image being filtered. The embodiments disclosed herein utilize a recursive filtering approach to implement an efficient space-variant filter with a small computational footprint. The efficiency is realized, at least in part, by avoiding the need to calculate a size of the kernel required, and the individual kernel elements, to achieve a full variance reduction for a pixel in a single filter iteration. A full variance reduction means the variance of a pixel is reduced from a detected value before being filtered, to within an acceptable tolerance of a target value specified by a user. Performing variance reduction in a single stage often requires the convolution of a large kernel (e.g., having at least eleven (11) rows and eleven (11) columns—expressed as "11×11" herein) with image data for a corresponding neighborhood of pixels. The result is time-consuming and complex operations that consume extensive computational resources that can interfere with parallel processing of filtering operations. Further, lengthy convolution operations generate numerous intermediate terms that consume vast memory resources. Such systems and techniques are too computationally-intensive, memory intensive and time consuming, and are thus not practical under many circumstances.

Instead, the systems and methods described herein recursively filter image data for each pixel as a series of filter iterations. For instance, the result of a first filter iteration applying a relatively small kernel (e.g., no more than seven (7) rows and seven (7) columns—"7×7," no more than five (5) rows and five (5) columns—"5×5," or no more than three (3) rows and three (3) columns—"3×3") can be subjected to at least a second filter iteration. The second filter iteration also involves the application of a relatively small kernel, which can be the same as the small kernel used for the first iteration, or a different small kernel. A plurality of filter iterations applying a small kernel to achieve a full variance reduction can consume fewer computational resources than a single filter operation applying a large kernel, generate fewer intermediate terms that are later combined, and are completed quickly.

Another efficiency improvement is believed to result from selecting one or more of the small, pre-defined kernels from a database to be applied to the image data for the pixels. The pre-defined kernels are selected from the database instead of being calculated as custom kernel elements, in real time, specific to each pixel as part of the filtering of that pixel to achieve the desired variance reduction. The finite number of pre-calculated, defined kernels are stored in the database, from where they are selectable by an image filter module of a computing system. The defined kernels are described herein as being pre-calculated or pre-defined, meaning that a set of different fixed-width (e.g., 3×3 or 5×5, for example) kernels is calculated and stored in the database before application of the kernels to the image data of the pixels begins. Additional efficiencies are gained because the kernels can be used more than one to filter image data for the same pixel, or for different pixels. Thus, the calculations required to determine a custom kernel can be avoided, while achieving the appropriate variance reduction.

Some embodiments of the recursive filter utilize a kernel of three (3) rows and three (3) columns ("3×3") to conserve computational resources. With a sufficient number of iterations (e.g., twelve (12)), such small kernels are effective to achieve variance reduction up to a factor of 100. In special cases when higher variance reduction is needed, larger filters (e.g., utilizing kernels having more than three (3) rows and columns) can be employed, optionally during a filter iteration performed in series with a filter iteration applying a 3×3 kernel.

In general, as provided herein, selection of pre-defined, small kernels that are convolved with image data for a neighborhood of pixels during a plurality of filter iterations efficiently filters space-variant images. The present filtering approach quickly achieves the desired variance reduction, limits the consumption of computational resources by avoiding the need to calculate kernels for each pixel in real time, and limits the quantity of memory required to store intermediate results. In particular, image data for the space-variant image and a target variance specified by a user are received at an image filter module. The target variance establishes a filtered variance desired by the user to be exhibited by each of a plurality of pixels included in the space-variant image as a result of being filtered. In other words, the filtered variance is the value of each pixel's variance desired by the user after completion of the filtering process.

The image filter module, for each of the plurality of pixels included in the space-variant image, detects a variance of the pixel. The variance of the pixel indicates a deviation of the image data for the pixel from a threshold. A variance reduction power is generated based on a relationship between the detected variance of the pixel and the target variance specified by the user. The variance reduction power is a measure of the extent to which the detected variance of a pixel, measured before being filtered, must be reduced to fall within an acceptable tolerance of the target variance specified by the user. At least a first small, defined kernel is selected by the image filter module from a database populated with a plurality of pre-defined kernels that are available to be selected for filtering the image data for the pixel. The selected kernel is applied to recursively filter the image data for the pixel during a plurality of filter iterations to cause the variance of the pixel to approach the target variance.

Figure 1:
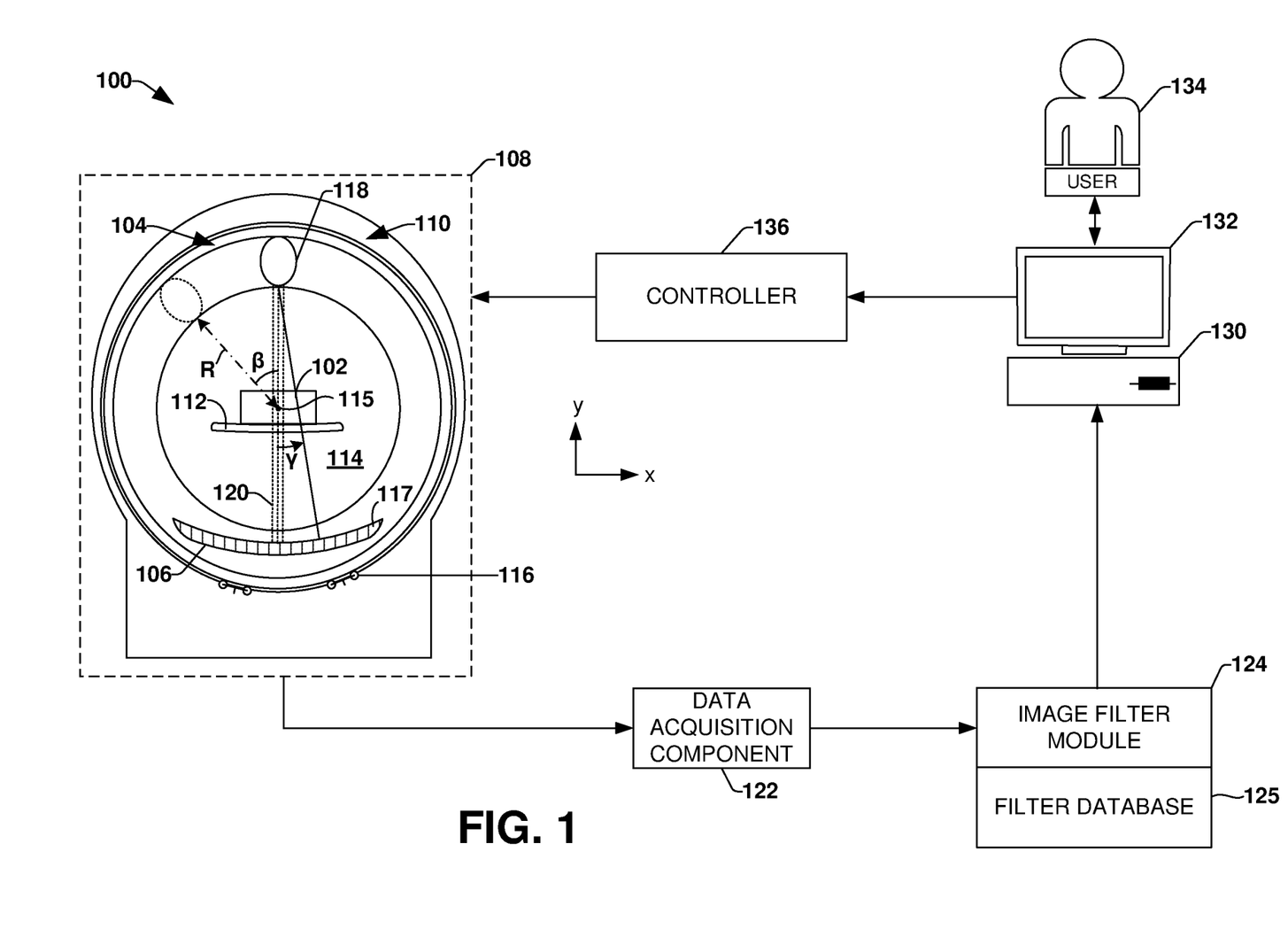
FIG. 1 illustrates an example environment of a computed tomography imaging modality for capturing space-variant images of a patient.

With reference to the drawings, FIG. 1 is an illustration of an illustrative environment 100 comprising a computed tomography (CT) system that may be configured to generate computed tomography images representative of an anatomical object 102 (e.g., patient, organ, muscle, tissue, etc.) or aspect(s) thereof. Such a system is an example of a medical modality that may be employed to capture space-variant images of patients. However, the methods and systems for filtering space-variant images are not limited to filtering images of patients captured by medical modalities. Any space-variant image, captured by sensors over a space-variant sampling grid can be the subject of the filtering methods and systems described herein. For the sake of brevity and clarity, however, the pixels filtered herein collectively form a space-variant image in the form of a CT scan.

Further, it may be appreciated that while the environment 100 in FIG. 1 describes a CT system configured to generate two-dimensional and/or three-dimensional images of the object 102 under examination, other radiation imaging modalities are also contemplated for generating images of the object 102, optionally for diagnostics purposes. Moreover, the arrangement of components and/or the types of components included in the environment 100 are merely provided as an example. By way of example, in some embodiments, a data acquisition component 122 is comprised within a detector array 106.

In the embodiment of the environment 100 in FIG. 1, an examination apparatus 108 of the CT system is configured to examine one or more objects 102, including an anatomical object prone to movement, such as a heart, not shown. With continued reference to FIG. 1, the examination apparatus 108 can comprise a rotating gantry 104 and a (stationary) support structure 110 (e.g., which may encase and/or surround at least a portion of the rotating gantry 104 (e.g., as illustrated with an outer, stationary ring, surrounding an outside edge of an inner, rotating ring)). During an examination of the object 102, the object 102 can be placed on a support article 112, such as a bed or conveyor belt, for example, that is selectively positioned in an examination region 114 (e.g., a hollow bore in the rotating gantry 104), and the rotating gantry 104 can be rotated and/or supported about an axis of rotation 115, and about the object 102 by a rotator 116, such as a motor, drive shaft, chain, roller truck, etc.

The axis of rotation 115 for a cylindrical CT system may be located at the center of the examination region 114, which is also the isocenter of the examination apparatus 108. The isocenter is the space through which the central ray of a set of beams of radiation 120 passes, and the object 102 may be positioned within the examination region 114 so the region of interest (the heart in the examples below) is centered at, or located adjacent to the isocenter. The distance R from the radiation source(s) 118 to isocenter is represented in broken lines in FIG. 1.

The rotating gantry 104 may surround a portion of the examination region 114 and may comprise one or more radiation sources 118 (e.g., an ionizing x-ray source, gamma radiation source, etc.) and a detector array 106 that is mounted on a substantially diametrically opposite side of the rotating gantry 104 relative to the radiation source(s) 118. The rotating gantry 104 can be rotated to sweep the radiation source(s) 118 through the plurality of angular locations about the axis of rotation 115, making full 360° revolutions. The angle β in FIG. 1 generally represents the gantry angle or the source angle at the different angular locations of the views as described below. During an examination of the object 102, the radiation source(s) 118 emits fan, cone, wedge, parallel beam (shown in the drawings), and/or other shaped radiation 120 configurations from a focal spot(s) of the radiation source(s) 118 (e.g., a region within the radiation source(s) 118 from which radiation 120 emanates) into the examination region 114. Such radiation 120 may be emitted substantially continuously and/or may be emitted intermittently (e.g., a brief pulse of radiation is emitted followed by a resting period during which the radiation source(s) 118 is not activated).

As the emitted radiation 120 traverses the object 102, the radiation 120 may be attenuated differently by different aspects of the object 102. Because different aspects attenuate different percentages of the radiation 120, an image(s) may be generated based upon the attenuation, or variations in the number of photons that are detected by the detector array 106. For example, more dense aspects of the object 102, such as a bone, a metal plate, electronic components, etc., may attenuate more of the radiation 120 (e.g., causing fewer photons to strike the detector array 106) than less dense aspects, such as skin or clothing.

The detector array 106 is configured to directly convert (e.g., using amorphous selenium and/or other direct conversion materials) and/or indirectly convert (e.g., using photodetectors and/or other indirect conversion materials) detected radiation into signals that can be transmitted from the detector array 106 to the data acquisition component 122 configured to compile signals that were transmitted within a predetermined time interval, or measurement interval, using various techniques (e.g., integration, photon counting, etc.). It may be appreciated that such a measurement interval may be referred to as a "view" and generally reflects signals generated from radiation 120 that was emitted while the radiation source(s) 118 was at a particular angular location relative to the object 102. Based upon the compiled signals, the data acquisition component 122 can generate projection data indicative of the compiled signals, for example.

The detector array 106 may be divided into a plurality of detector cells 117 arranged in a space-variant arrangement of rows and columns. Using the XYZ coordinates of FIG. 1 as a reference, the detector cells may be arranged in rows that extend in the X direction, and columns that extend in the Z direction, which is a direction parallel with the axis of rotation 115. The fan angles γ in FIG. 1 are the individual angle of each detector cell 117, as seen from the radiation source(s) 118, or the angle relative to the center ray emitted by the radiation source(s) 118. Midplane projection data and backprojection data may be collected and used to compare the projections with the backprojections. Midplane data includes only projection and backprojection data acquired by a centrally located portion of the rows of the detector array 106.

For example, an embodiment of the CT system using forty-millimeter (40-mm) (or four-centimeter (4-cm) ) collimation includes sixty four (64) rows of detector cells to capture each of four slices that are to be assembled into a single three-dimensional image encompassing a portion of the object 102. A set of parallel x-ray beams, referred to herein as parallel rays of radiation 120, emitted by the radiation source(s) 118 encounter the object 102 before being received by the detector array 106. The midplane data comprises projection and backprojection data collected by one, or a plurality of centrally-located rows which, in the present example of sixty four (64) rows (numbered sequentially), includes the $32^{nd}$ and $33^{rd}$ rows. The centrally-located rows are used to collect the midplane data for comparing the projections and backprojections because the projections and backprojections of the centrally-located rows are substantially aligned with each other. For a stationary object 102, there is little to no offset between the projections and corresponding backprojections caused by the position of the midplane detector cells relative to the radiation source(s) 118, referred to as the cone angle, for example.

The illustrative example of the environment 100 further comprises an image filter module 124 configured to filter the space variant images captured by the examination apparatus 108. The image filter module 124 is shown in FIG. 1 and described as forming a portion of the environment 100. However, other embodiments of the image filter module 124 can form a portion of a computing system such as computing device 612, described below with reference to FIG. 6. The computing device 612 can be: (i) locally connected (e.g., direct, wired connection between the computing device 612 and the examination apparatus 108), (ii) network connected to the environment 100 (e.g., physically located in a different location but in communication with the examination apparatus 108 through an intermediate networking device forming a portion of a communication network), or (iii) isolated from the environment 100, but able to receive image data for filtering purposes via a portable computer-readable medium.

The image filter module 124 is configured to access a filter database 125, interchangeably referred to herein as a filter bank. The filter database 125 is populated with a plurality of defined kernels that are available to be selected for filtering the image data for the pixel. The filter database 125 can be embedded as a portion of the image filter module 124, or can be separate from, but accessible by the image filter module 124.

The illustrative environment 100 further comprises a terminal 130, or workstation such as the computing device 612, that may be configured to receive the image data captured by the examination apparatus 108. The terminal 130 may also be configured to present the image data and/or information for display on a monitor 132 to a user 134 (e.g., medical personnel, etc.). In this way, the user 134 can inspect the image(s) to identify areas of interest within the object 102, possibly for diagnostic purposes. The terminal 130 can also be configured to receive user input, which can direct operations of the examination apparatus 108 (e.g., a speed of a conveyor belt), for example.

The user input can also include one or more parameters governing the recursive filtering of the space-variant image. For example, the terminal 130 can be configured to generate a graphical user interface ("GUI") with one or more fillable fields in which the user 134 can enter values defining: a target variance, a desired variance reduction, or any other parameter that controls an aspect of the filtering of space-variant images by the image filter module 124. As mentioned above, the target variance establishes a filtered variance that the user desires to be exhibited by each of a plurality of pixels included in the space-variant image as a result of being filtered. Thus, a substantially uniform pixel variance can be established within an acceptable tolerance (e.g., ±20%, or ±15%, or ±10%, or ±5%) of the target variance specified by the user.

In the illustrated embodiment of environment 100, a controller 136 is operably coupled to the terminal 130. In one example, the controller 136 is configured to receive input from the terminal 130, such as user input for example, and to generate instructions for the examination apparatus 108 indicative of operations to be performed. For example, the user 134 may desire to reexamine the object 102, and the controller 136 may issue a command instructing the support article 112 to reverse direction (e.g., bringing the object 102 back into an examination region 114 of the examination apparatus 108).

The component diagram of FIG. 1 is merely intended to illustrate one embodiment of one type of imaging modality and is not intended to be interpreted in a limiting manner. For example, the functions of one or more components described herein may be separated into a plurality of components and/or the functions of two or more components described herein may be consolidated into merely a single component. Moreover, the imaging modality may comprise additional components configured to perform additional features, functions, etc. and/or some components described herein may be optional.

Figure 2:
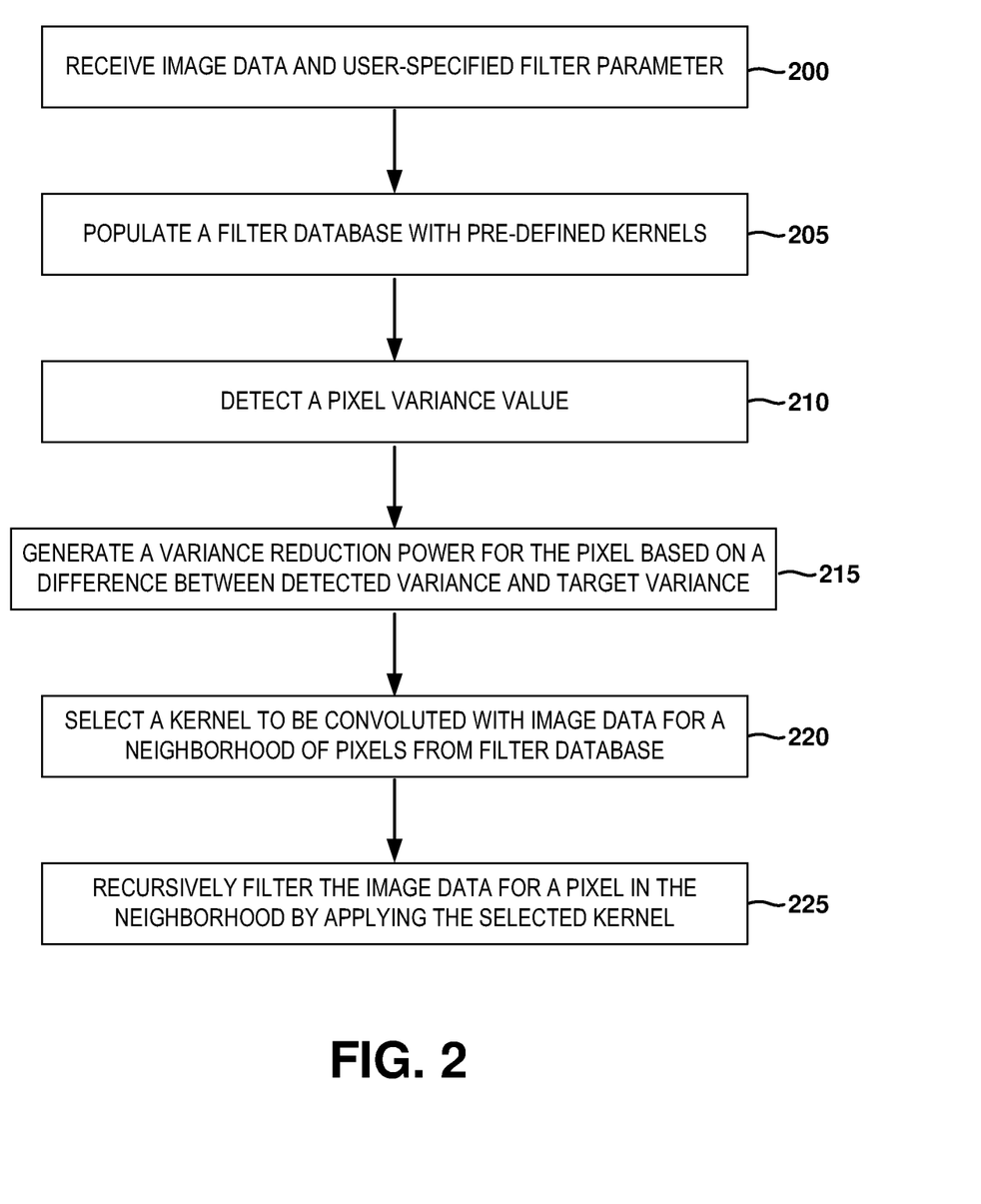
FIG. 2 illustrates a flow diagram of an illustrative method for recursively filtering a space-variant image.

A method of recursively filtering a space-variant image is described with reference to the flow diagram of FIG. 2. The image data for a space-variant image to be filtered and at least one filter parameter are received by the image filter module 124 at step 200. By way of example, the received filter parameter includes at least the target variance input into a fillable field of a GUI displayed by the terminal 130. The target variance is the value of the variance the user wishes to establish, substantially uniformly, across the pixels of the space-variant image as a result of being filtered.

The filter database 125 can optionally be populated with the plurality of pre-defined kernels at step 205. For an efficient implementation, the filter database 125 can be populated with kernels for achieving all possible variance reductions based on the received image data. The kernels, and the granularity of the kernel distribution between the minimum kernel $p_{min}$ and the maximum kernel $p_{max}$ can optionally be based on the difference between the highest variance and the lowest variance detected in the received image data. A detailed description of the process for generating the pre-defined filters in the filter database 125 is set forth below.

The image filter module, for each of a plurality of pixels in the space-variant image, detects a variance of the pixel at step 210. The detected variance can indicate a deviation of a quality of the pixel, as represented by the image data for the pixel, from a threshold. The threshold can be a statistical value determined based on the received image data for the space-variant image such as a standard deviation, an average value, a median value, or other statistical value related to the radiation 120 emitted by the radiation sources 118 and received by the detector cells 117, for example.

The detected variance is compared to the target variance to generate, at step 215, the variance reduction power required of the kernel to be selected for filtering the pixel. Based on the relationship between the target variance and the detected variance, the variance reduction power is generated as the factor by which the detected variance is to be reduced to approximately equal the target variance. For example, a detected variance of 90 is to be reduced by a factor of 9 to achieve a target variance of 10. Thus, the variance reduction power of the one or more kernels to be selected from the filter database 125 is generated to be a factor of 9 in the present example.

At least a first small, defined kernel is selected by the image filter module 124, at step 220, from among the available kernels populating the filter database 125. The one or more kernels is/are selected based on the variance reduction power required to achieve the desired filtering result. For example, the kernels can optionally be indexed in the filter database 125 according to their respective variance reduction powers. In other words, the identity and address of the appropriate kernel can be determined as a function of the kernel's variance reduction power. For some embodiments, the variance reduction power is the sole variable required to select and locate the corresponding kernel(s) in the filter database 125 to be applied to the neighborhood of pixels achieve the desired filtration result.

At step 225, the image data for the pixel is filtered during a plurality of filter iterations to cause the variance of the pixel to approach the target variance. During at least one of the filter iterations, the selected kernel is convolved with, or otherwise applied to the image data for the neighborhood of pixels. Multiple iterations can be performed by repeatedly applying the same kernel, or a plurality of different kernels, each associated with a different variance reduction power can be applied during different iterations to filter the pixel.

Steps 205-225 of the filtering process can be repeated for each of a plurality of pixels in the space-variant image that are to be filtered. Pixels having a similar variance value can be filtered by selecting and applying the same kernel from the filter database 125 to the image data for those similar pixels. Re-using the same kernel more than once avoids consuming the computational resources that would otherwise be expended to calculate the kernel for each pixel, individually, on the fly. And by storing unique, small kernels in the database, indexed by variance power reduction, the memory requirements to store repetitive kernel calculations and intermediate results can be limited.

Figures 3, 4:
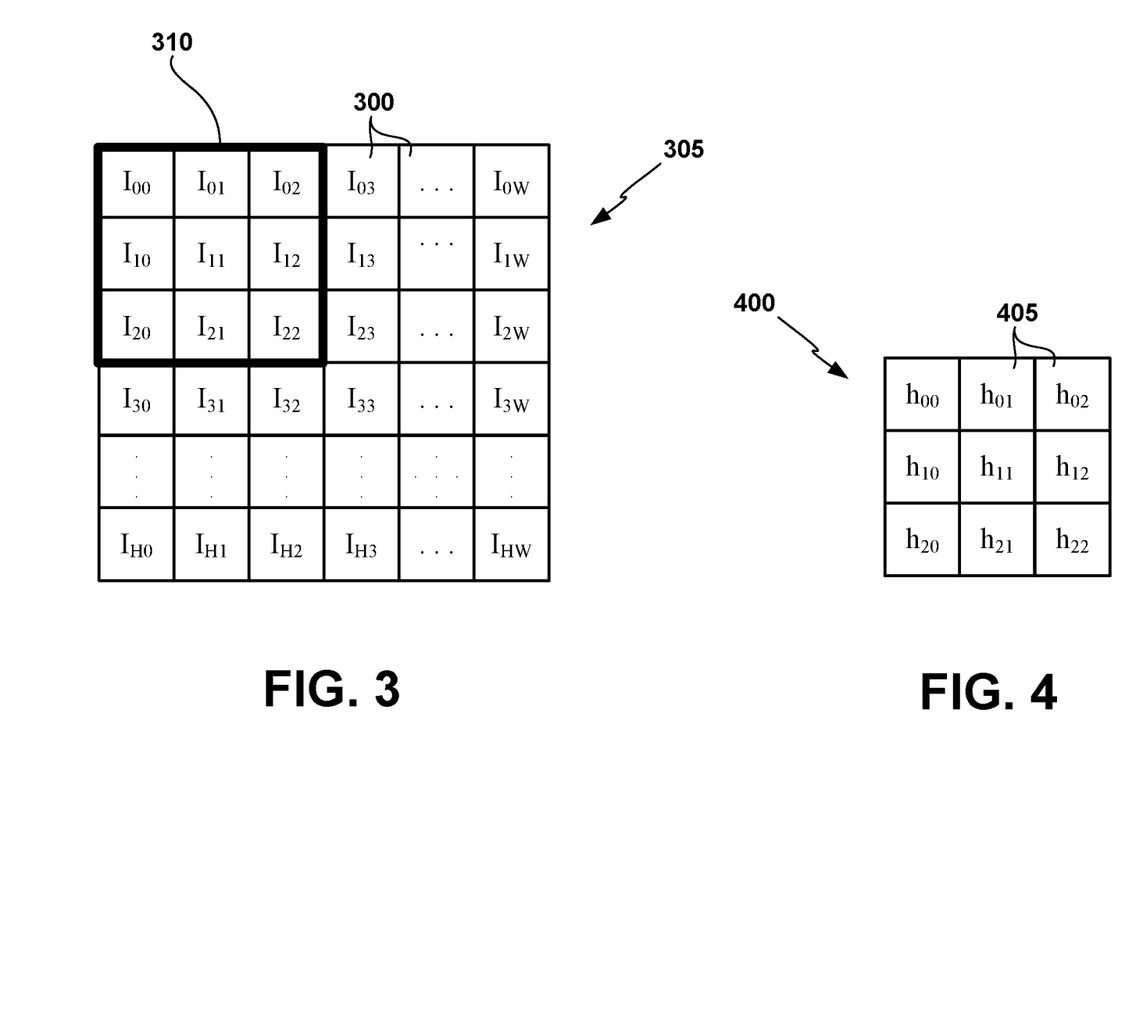
FIG. 3 is a schematic representation of a matrix including image data for pixels included in a space-variant image to be filtered.
FIG. 4 illustrates a pre-computed 3×3 kernel that is selectable from a filter database to be convolved with a neighborhood of pixels in a space-variant image.

Constructing the filter kernels to be will be described with reference to FIGS. 3 and 4. FIG. 3 is a matrix of image pixels 300 collectively forming a space-variant image 305. The space-variant image 305 $f: \mathbb{Z}^2 \to \mathbb{R}$ is defined on a rectangular domain $I=[0, W] \times [0, H]$. Each image component is denoted mathematically by $f_i$, with 2D index $i \in I$. A square neighborhood 310, represented by the symbol $\Omega$ in the expressions below, of pixels 300 centered on the pixel 300 with image data $I_{11}$ is shown as being highlighted by a bold outline. For the sake of clarity, the individual pixels 300 will be referenced in terms of their image data designation in the matrix of FIG. 3. For example, the pixel 300 having image data $I_{11}$ is referred to below as pixel $I_{11}$. Although the neighborhood 310 is shown in FIG. 3 as encompassing a 3×3 matrix of pixels, the present disclosure is not so limited. The neighborhood 310 can be any small square matrix having the same size as a kernel 400 (FIG. 4) to be selected from the filter database 125 and convolved with the neighborhood 310 of pixels 300. For the sake of brevity and clarity, however, a 3×3 neighborhood 310 and kernel 400 are used as examples herein.

The kernel 400 of FIG. 4 is a square matrix of kernel coefficients 405. The size of the kernel 400 matches the size of the neighborhood 310. The kernel is represented mathematically as $h: \mathbb{Z}^2 \to \mathbb{R}$, and is defined as being applicable to a square neighborhood $\Omega=[-L, L] \times [-L, L]$ of pixels 300 in the space-variant image 305. The coefficients of the kernel 400 are denoted in the expressions below as $c_j$, with 2D index $j \in \Omega$. The filter coefficients $c_j$ must satisfy the following conditions:

$$\Sigma_{j \in \Omega} c_j = 1, \text{ and } c_j \geq 0 \text{ for all } j \text{ in } \Omega. \tag{1}$$

For the above conditions to be true, $c_j \leq 1$ for all j in $\Omega$. With this notation, the convolved image, denoted $\hat{f}$, is defined as the expression:

$$\hat{f}_i = [f * g]_i = \Sigma_{j \in \Omega} c_j f_{i-j}, \tag{2}$$

where the "*" symbol represents the convolution operator.

The variance of f at each point in I is designated as $v_i$, and the target variance is designated by $v_T$. For the pixels 300 requiring only variance reduction as a result of being filtered, and not variance enlargement, $v_T \leq v_i$ for all i, the Variance Reduction Ratio ("VRR") is defined as the expression:

$$q_i = \frac{v_i}{v_T} \tag{3}$$

Assuming $\xi_i$ constitutes independent and identically distributed ("iid") random variables, the Variance Reduction Power ("VRP") of the filter h is defined as the expression:

$$p_h = \frac{V[\xi]}{V[\xi * h]}, \tag{4}$$

where $V[\bullet]$ is the variance operator. Accordingly, VRP can be computed from the kernel coefficients, according to the following lemma.

Let $\xi_i$ be iid random variables defined on a rectangular domain I in $\mathbb{Z}^2$. Let $h=\{c_j\}$, $j \in \Omega$, be a 2D low-pass filter satisfying conditions (1). The variance reduction power of h is given by the expression:

$$p_h = \left(\Sigma_{j \in \Omega} c_j^2\right)^{-1} \tag{5}$$

for square symmetric kernels computing the VRP according to expression (5) can be simplified to:

$$p_h = \frac{1}{(\text{trace}(h))^2}, \tag{6}$$

where the kernel trace is defined as the sum of the elements on its main diagonal.

To construct a filter with a desired VRP, and for an efficient implementation, a filter bank H is pre-computed to span all possible values of VRP, from smallest to largest. As mentioned above, the filter bank H eliminates the need to calculate kernels on the fly, and allows reusing kernels at different points. For fast addressing kernels in the filter bank H, the kernel index can be directly proportional to the VRP.

The smallest VRP value $p_{min}$ of the kernels in the filter bank is set to 1, and it corresponds to the case when no variance reduction is applied. In other words, a kernel $h_0$ having the property that $f * h_0 = f$ for any image f is the delta kernel:

$$h_0: c_{j_1 j_2} = \begin{cases} 1, & j_1 = j_2 = 0 \\ 0, & \text{otherwise} \end{cases} \tag{7}$$

$$(j_1, j_2) \in \Omega$$

The value $p_{max}$ is a function of the size of the kernel according to the expression (K=2L+1), since larger kernels have a greater capacity for variance reduction than smaller kernels. For a given K×K kernel size, the largest variance reduction is provided by the box kernel:

$$h_{N-1}: c_j = \frac{1}{K^2}, j \in \Omega \tag{8}$$

It follows from expression (5) that $p_{max}=K^2$ (for a rectangular $K_1 \times K_2$ kernel $p_{max}=K_1 \times K_2$).

According to some embodiments, the kernels continuously spanning the VRP values between $p_{min}$ to $p_{max}$ can be calculated as Gaussian kernels, each having a given VRP. The expression for the Gaussian kernel $g(\sigma)=\{g_j\}$ centered at (0, 0) and defined on $\Omega$ is:

$$g_j = \frac{\exp\left(-\frac{\|j\|_2^2}{2\sigma^2}\right)}{\sum_{i\in\Omega}\exp\left(-\frac{\|i\|_2^2}{2\sigma^2}\right)}, j \in \Omega \quad (9)$$

where the $l_2$ norm is defined by $\|j\|_2^2 = (j_1^2 + j_2^2)$. The width of the Gaussian kernel is determined by the parameter $\sigma$. As $\sigma$ increases and the kernel becomes wider, the VRP for that kernel also increases. In other words, VRP is a non-linear, monotonically increasing function of $\sigma$. In general, however, there is no closed form equation between $\sigma$ and the kernel VRP. Further, it is difficult to find values of a corresponding to $p_{min}$ and $p_{max}$ for such embodiments. While $\sigma$ can be selected as very small numbers (e.g., $\sigma_{min}=0.2$) to produce the delta kernel, there is no finite value of $\sigma_{max}$ that can produce the box kernel (the box kernel is the limiting case of the Gaussian kernel in expression (9) for $\sigma\to\infty$). With sufficiently large $\sigma_{max}$ a kernel having a VRP close to $p_{max}$ can be determined in theory. However, the value of $\sigma_{max}$ depends on the kernel size, and a very large kernel size would be required to realize the sufficiently large $\sigma_{max}$ value, thereby negating some of the efficiency advantages described herein.

According to other embodiments, atomic kernels can be pre-calculated instead of Gaussian kernels to avoid large kernel sizes. An atomic kernel $A_L$ of size K×K (K=2L+1), with parameter a, $0 \le a \le 1$, is defined by the outer product: $A_L = U_L \otimes U_L$, where the generating kernel $U_L = \{u_l\}$, $l \in [-L, L]$ is given by $u_l = a^{l^2}$. For example, $U_1 = (a, 1, a)$, $U_2 = (a^4, a, 1, a, a^4)$, $U_3(a) = (a^9, a^4, a, 1, a, a^4, a^9)$, etc. The size parameter L is a meta-parameter that can be specified for the particular imaging task for which filtering is being performed. Examples of 3×3 and 5×5 kernels are as follows:

$$A_1 = U_1 \otimes U_1 = \begin{bmatrix} a^2 & a & a^2 \\ a & 1 & a \\ a^2 & a & a^2 \end{bmatrix}, \quad (10)$$

$$A_2 = U_2 \otimes U_2 = \begin{bmatrix} a^8 & a^6 & a^4 & a^6 & a^8 \\ a^6 & a^2 & a & a^2 & a^6 \\ a^4 & a & 1 & a & a^4 \\ a^6 & a^2 & a & a^2 & a^6 \\ a^8 & a^6 & a^4 & a^6 & a^8 \end{bmatrix}$$

Note that the atomic kernel with parameter a corresponds to the truncated Gaussian kernel with parameter $\sigma_a$ given by the expression:

$$\sigma_a = \frac{1}{\sqrt{-2\ln a}}. \quad (11)$$

To satisfy the normalization condition defined in expression (1), $A_L$ is divided by its sum, $\|A_L\|_1$, where the $l_1$ kernel norm $\|\cdot\|_1$ is defined as the sum of its elements (note that all kernel elements are non-negative). Atomic kernels have the property that their sum can be computed fast by adding elements along the middle row:

$$\|A_L\|_1 \equiv \sum_{j\in\Omega} A_j = \left(\sum_{l\in[-L,L]} a^{l^2}\right)^2 = \|U_L\|_1^2, \quad (12)$$

From expression (6) above, the VRP of a normalized atomic kernel can be computed by adding elements along the main diagonal:

$$p_L(a) \equiv p[A_L] = \quad (13)$$
$$\left(\frac{1}{\|A_L\|_1}\sum_{l\in[-L,L]} a^{2l^2}\right)^{-2} = \frac{\left(\sum_{l\in[-L,L]} a^{l^2}\right)^4}{\left(\sum_{l\in[-L,L]} a^{2l^2}\right)^2} = \frac{\|U_L\|_1^4}{\|U_L\|_2^2}$$

Two advantages of the atomic kernels for constructing a filter bank is that they use a parameter with the fixed bounds $0 \le a \le 1$, and they contain the box kernel as their upper limit.

A normalized atomic kernel is computed to determine the value of a for each desired VRP $p \in [p_{min}, p_{max}]$. Such a computation involves solving expression (13) for a. The solution involves a high-order polynomial, which makes an analytic solution impractical for most cases. For some embodiments, a numerical method can be employed to find the kernel parameter a. Using expression (13), a lookup table P(a) is pre-computed for an oversampled set of a values (e.g., 1000 samples) for the range $0 \le a \le 1$. To facilitate selection of the appropriate kernel, for indexing of the filter bank index p, a corresponding value of $a_p$ is determined from the VRP[a] table by inverse lookup.

Once the filter bank has been pre-computed, variance reduction for each of a plurality of pixels included in the space-variant image variance can be performed as follows. The target variance $v_T$ and the array of image data for the pixels f is received by the image filter module 124, and the VRR is determined based on the detected variance for each pixel and the target variance $v_T$.

Of all kernels in a filtering chain (i.e., one selected kernel to be repeatedly applied, or at least two different selected kernels to each be applied to filter a pixel in multiple iterations), the box kernel provides the maximum VRP. Therefore, the maximum VRP at iteration n is given repeatedly applying the box kernel n times. However, repeatedly applying the box kernel does not allow the VRP to be chosen arbitrarily, as it can be in the present methods and systems.

According to some embodiments, the repeated box filter application is improved to achieve the desired variance reduction, which is not limited to discrete values dictated by a defined number of applications of the box kernel. If the box kernel is denoted by b on $\Omega$ in expression (Error! Reference source not found.) above, and the repeated application of the box kernel is denoted by $b_n$:

$$b_n = \underbrace{b * \ldots * b}_{n \text{ times}}$$

For completeness, the set of $b_n$ can be augmented with the delta kernel, i.e., $b_0 = h_0$ defined by expression (7), above. Successive application of a convolution kernel does not bring the same variance reduction power as the first iteration (i.e., $p(h_1 * h_2) \ne p(h_1)p(h_2)$). Table 1 lists maximum variance reduction for different numbers of iterations ($p_{max}^{(n)}$) for 3×3, 5×5, and 7×7 box kernels:

TABLE 1

Maximum variance reduction based on number of iterations.

| Iterations | 3 × 3 Kernel | 5 × 5 Kernel | 7 × 7 Kernel |
|---|---|---|---|
| 1 | 9.00 | 25.00 | 49.00 |
| 2 | 18.17 | 54.07 | 108.03 |
| 3 | 26.73 | 79.63 | 158.97 |
| 4 | 35.13 | 104.76 | 209.20 |
| 5 | 43.50 | 129.87 | 259.41 |
| 6 | 51.87 | 154.98 | 309.64 |
| 7 | 60.24 | 180.10 | 359.88 |
| 8 | 68.62 | 205.22 | 410.12 |

From Table 1, the total variance reduction at n iterations can be approximated by a simple model:

$$q = n p_{max} + p_{last}, \quad (14)$$

from which the number of iterations can be estimated as $$n = \left\lfloor \frac{q}{p_{max}} \right\rfloor.$$

The symbol $\lfloor \cdot \rfloor$ represents the integer floor function. In expression 14, $p_{last}$ is the VRP at the last iteration, which can be approximated by $$p_{last} = \frac{q}{n p_{max}}.$$

For a more-exact approach to perform the recursive filter and at least approximately achieve the target variance reduction, the VRP of the filter h at iteration n is defined by:

$$p_h^{(n)} = \frac{V[\xi]}{V[\xi * h * b_n]} \quad (15)$$

Expression (15) is consistent with the non-iterative definition in expression (4), with n=0. It is worth noting that:

$$p_{max}^{(n)} = \frac{V[\xi]}{V[\xi * b_{n+1}]}. \quad (16)$$

At this point the incremental Variance Reduction Power (iVRP) of the filter h at iteration n is defined as:

$$r_h^{(n)} = \frac{V[\xi * b_n]}{V[\xi * h * b_n]}. \quad (17)$$

Given iVRP $r_h^{(n)}$ we can compute the full VRP at iteration n as:

$$p_h^{(n)} = p_{max}^{(n-1)} r_h^{(n)}, \quad (18)$$

Table 2 shows the maximum incremental variance reduction at each iteration, $r_{max}^{(0)} = p_{max}^{(0)}$, $$r_{max}^{(n)} = \frac{p_{max}^{(n)}}{p_{min}^{(n)}},$$

where $p_{min}^{(n)} = p_{max}^{(n-1)}$). Each successive iteration has smaller iVRP than the previous iteration.

TABLE 2

Maximum incremental variance reduction at each iteration.

| Iterations | 3 × 3 Kernel | 5 × 5 Kernel | 7 × 7 Kernel |
|---|---|---|---|
| 1 | 9.000 | 25.000 | 49.000 |
| 2 | 2.019 | 2.163 | 2.205 |
| 3 | 1.471 | 1.473 | 1.471 |
| 4 | 1.314 | 1.316 | 1.316 |
| 5 | 1.238 | 1.240 | 1.240 |
| 6 | 1.192 | 1.193 | 1.194 |
| 7 | 1.161 | 1.162 | 1.162 |
| 8 | 1.139 | 1.139 | 1.140 |

Atomic kernel at iteration n is defined as $A_L^{(n)} = U_L^{(n)} \otimes U_L^{(n)}$, with the generating 1D kernel $U_L^{(n)}(a)$ given by: $U_L^{(n)}(a) = b_n^1 * U_L(a)$, where $b_n^1$ is the 1D box kernel repeated n times. Similar to expression (13), the VRP of the atomic kernels at iteration n can be determined according to:

$$p_L^{(n)}(a) = \frac{\|U_L^{(n)}(a)\|_1^4}{\|U_L^{(n)}(a)\|_2^2} \quad (19)$$

The iterated atomic kernels $A_L^{(n)}$ are not computed in this algorithm, but only the expected VRP at each iteration. Since the VRP depends on the iteration number, the filter bank needs to be pre-computed for each iteration.

To pre-compute the filter bank, values of $p_{min}^{(n)}$, $p_{max}^{(n)}$ are determined from expression (19) (also shown in Table 1). Lookup tables for the oversampled (e.g., 1,000) values of a are generated for $P_n(a)$ for $0 \leq a \leq 1$ per expression (19). For discrete values of $p \in [p_{min}^{(n)}, p_{max}^{(n)}]$:

(i) Find $a_p = \mathrm{argmin}(|P_n(a) - p|)$ by inverse table lookup; and (ii) Compute the filter bank kernel with VRP of p: $H_n[p] = A_L(a_p)$, resulting in $H_n$ as the output, which constitutes the filter bank containing the kernels available to be selected by the image filter module 124.

With the filter bank pre-calculated, the recursive filter process can continue by setting the iteration number n=0. So long as any $q_i > q_{min}$ repeat the following steps:

(i) Compute $p_{min}^{(n)}$, $p_{max}^{(n)}$ (see expression (19) and Table 1) and $r_{max}^{(n)}$ for the current iteration n;

(ii) Loop over all pixels $i \in I$ such that $q_i > q_{min}$ by:

(a) setting iRVP $r = q_i$. If $r > r_{max}^{(n)}$ set $r = r_{max}^{(n)}$, (b) computing $p = r \, p_{min}^{(n)}$ and selecting the kernel $h_p = H[p]$, (c) convolving $\hat{f}_i^{(n)} = \hat{f}_i^{(n-1)} * h_p$, and (d) updating $q_i = q_i / r$;

(iii) Increment the iteration number n=n+1; and (iv) Output $\hat{f} = \hat{f}^{(n)}$.

The embodiments above used approximations or numerical methods to compute the filter bank H, requiring the pre-computation of lookup tables. However, the 3×3 kernel is among the simplest atomic kernels, and embodiments of the present methods and systems can employ closed-form equations to compute the 3×3 filter bank, eliminating the need for precomputed lookup tables. For such embodiments, the first three iterations are sufficiently different to warrant separate consideration. However, numerical results suggest that the VRP remains almost constant after the third iteration. Thus, the atomic kernel parameter (and therefore the atomic kernel) can be calculated for the first three iterations, and the result for the third iteration re-used for subsequent (i.e., after 3) iterations.

According to such embodiments, for iterations n<3, compute $p_{min}^{(n)}$, $p_{max}^{(n)}$ according to expression (19) and Table 1. For discrete values of $p \in [p_{min}^{(n)}, p_{max}^{(n)}]$ for the first iteration, compute $a_p^{(n)}$ per expression (20), as follows:

$$a_p^{(0)} = \begin{cases} 0.25, & p = 4 \\ \frac{-2 + \sqrt{2t(3-t)}}{2(2-t)}, t = \sqrt{p}, & \text{otherwise} \end{cases}, 1 \leq p \leq p_{max}^{(0)} \quad (20)$$

For the second iteration, compute $a_p^{(n)}$ per expression (21), as follows:

$$a_p^{(1)} = -\frac{1}{2} + \sqrt{\frac{t}{8(9-2t)}}, t = \sqrt{p}, p_{min}^{(1)} < p \leq p_{max}^{(1)} \quad (21)$$

For the third iteration, compute $a_p^{(n)}$ per expression (22), as follows:

$$a_p^{(2)} = -\frac{32t - 162 + \sqrt{6t(81-13t)}}{324 - 58t}, t = \sqrt{p}, p_{min}^{(2)} < p \leq p_{max}^{(2)} \quad (22)$$

The filter bank kernels with VRP of p are calculated as: $H_n[p] = A_L(a_p)$ for the first three iterations. For iterations $n \geq 3$, it can be assumed that $H_n = H_2$, and the values of $H_n$ are output to be populated in the filter database 125.

Figure 5:
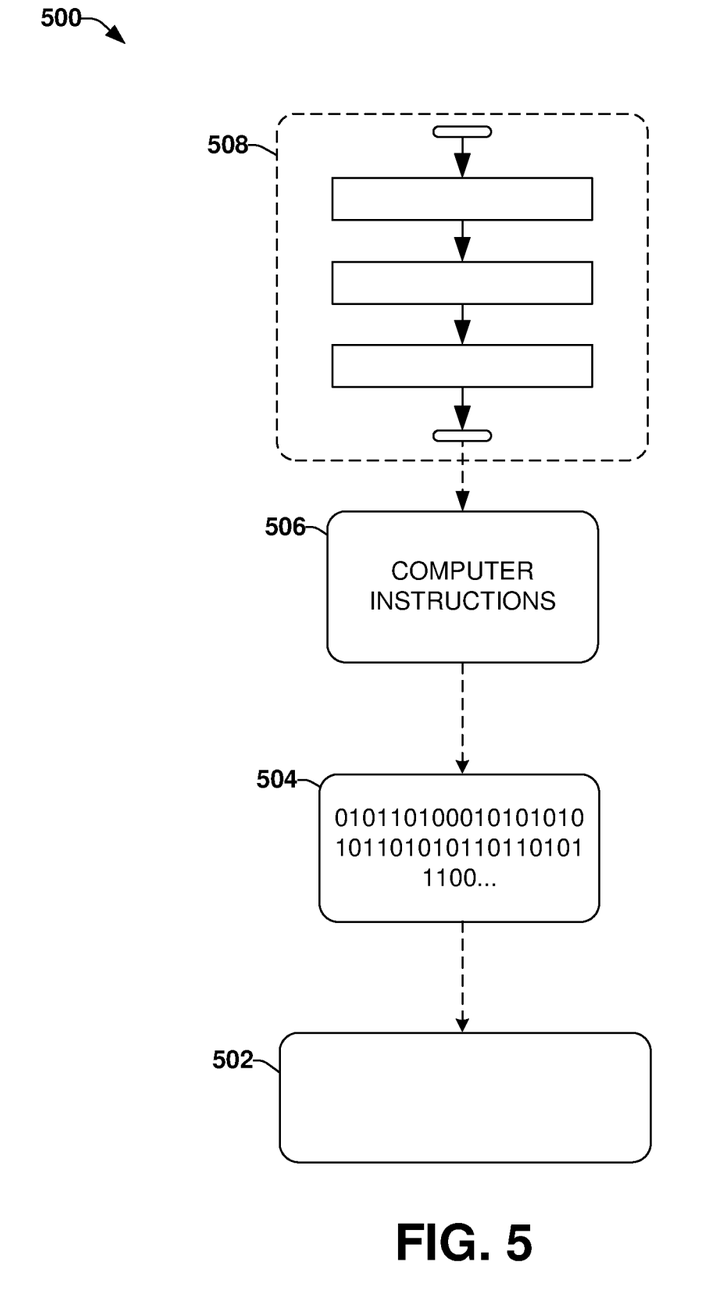
FIG. 5 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 5, wherein the implementation 500 comprises a computer-readable medium 502 (e.g., a CD-R, DVD-R, or a platter of a hard disk drive), on which is encoded computer-readable data 504. This computer-readable data 504 in turn comprises a set of processor-executable instructions 506 configured to operate according to one or more of the principles set forth herein. In one such embodiment of implementation 500, the processor-executable instructions 506 may be configured to perform a method 508, such as at least some of the method depicted in FIG. 2. In another such embodiment, the processor-executable instructions 506 may be configured to implement a system, such as at least some of the example environment 100 of FIG. 1, for example. Many such computer-readable media may be devised by those of ordinary skill in the art that are configured to operate in accordance with one or more of the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system," "interface," and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
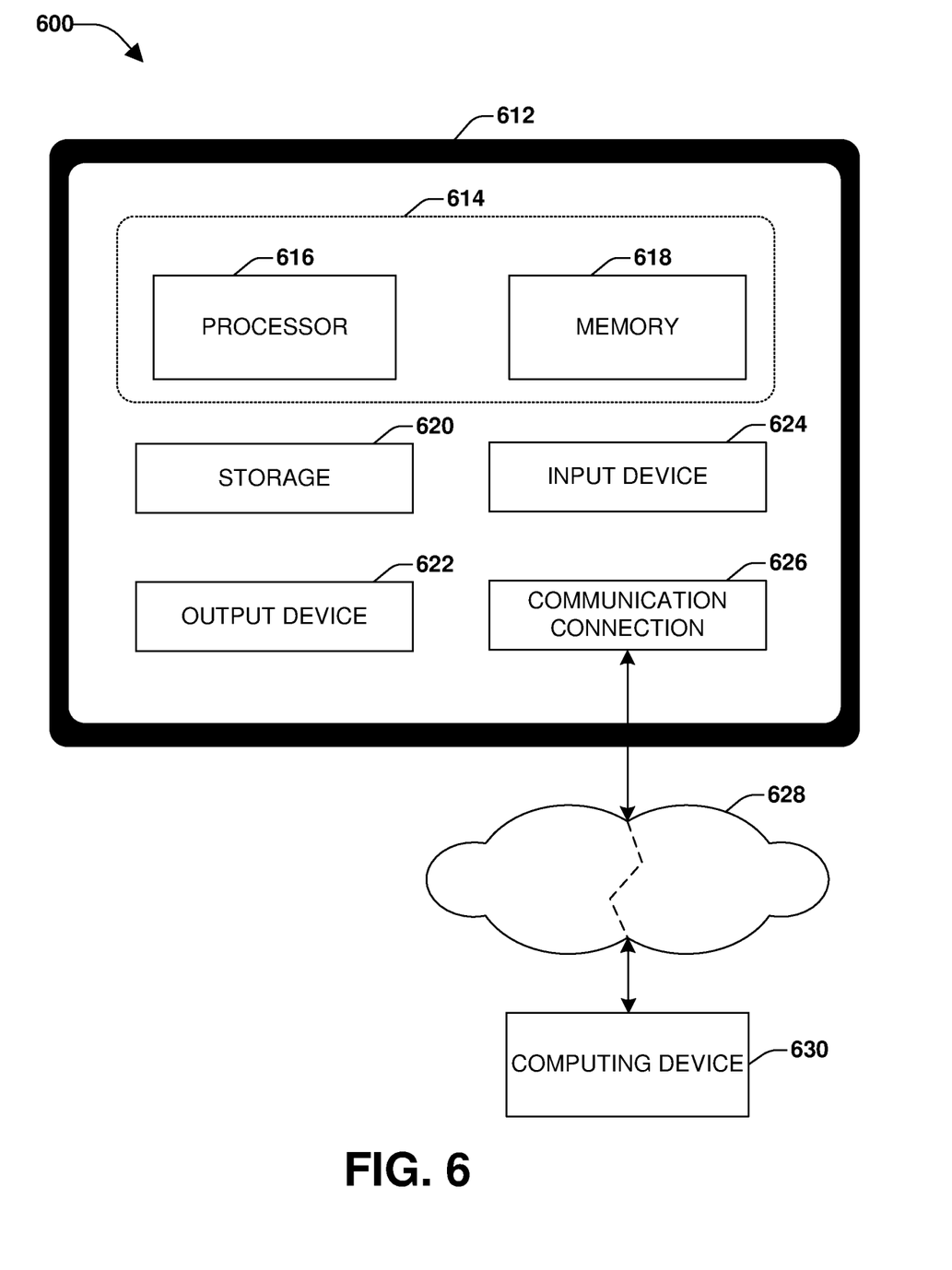
FIG. 6 illustrates an example computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer-readable instructions" being executed by one or more computing devices. Computer-readable instructions may be distributed via computer-readable media (discussed below). Computer-readable instructions may be implemented as program modules, such as functions, objects, Application Programming Interfaces (APIs), data structures, and the like, that perform particular tasks or implement particular abstract data types. Typically, the functionality of the computer-readable instructions may be combined or distributed as desired in various environments.

FIG. 6 illustrates an example of a system 600 comprising a computing device 612 configured to implement one or more embodiments provided herein. In one configuration, the computing device 612 includes at least one processor 616 and memory 618. Depending on the exact configuration and type of computing device, memory 618 may be volatile (such as RAM, for example), non-volatile (such as ROM, flash memory, etc., for example) or some combination of the two. This configuration is illustrated in FIG. 6 by dashed line 614.

In other embodiments, the computing device 612 may include additional features and/or functionality. For example, the computing device 612 may also include additional storage (e.g., removable and/or non-removable) including, but not limited to, magnetic storage, optical storage, and the like. Such additional storage is illustrated in FIG. 6 by storage 620. In one embodiment, computer-readable instructions to implement one or more embodiments provided herein may be in storage 620. Storage 620 may also store other computer-readable instructions to implement an operating system, an application program, and the like. Computer-readable instructions may be loaded in memory 618 for execution by processor 616, for example.

The term "computer-readable media" as used herein includes computer storage media. Computer storage media includes volatile and nonvolatile, removable and non-removable media implemented in any method or technology for storage of information such as computer-readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by the computing device 612. Computer storage media does not, however, include propagated signals. Rather, computer storage media excludes propagated signals. Any such computer storage media may be part of computing device 612.

Computing device 612 may also include communication connection 626 that allows computing device 612 to communicate with other devices. Communication connection 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection 626 may include a wired connection or a wireless connection. Communication connection 626 may transmit and/or receive communication media.

The term "computer-readable media" may include communication media. Communication media typically embodies computer-readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Computing device 612 may include input device 624 such as keyboard, mouse, pen, voice input device, touch input device, infrared cameras, video input devices, and/or any other input device. Output device 622 such as one or more displays, speakers, printers, and/or any other output device may also be included in computing device 612. Input device 624 and output device 622 may be connected to computing device 612 via a wired connection, wireless connection, or any combination thereof. In one embodiment, an input device or an output device from another computing device may be used as input device 624 or output device 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer-readable instructions may be distributed across a network. For example, a computing device 630 accessible via a network 628 may store computer-readable instructions to implement one or more embodiments provided herein. Computing device 612 may access computing device 630 and download a part or all of the computer-readable instructions for execution. Alternatively, computing device 612 may download pieces of the computer-readable instructions, as needed, or some instructions may be executed at computing device 612 and some at computing device 630.

Various operations of embodiments are provided herein. In one embodiment, one or more of the operations described may constitute computer-readable instructions stored on one or more computer-readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

It may be appreciated that "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. Similarly, illustrated ordering(s) of acts is not meant to be limiting, such that different orderings comprising the same of different (e.g., numbers) of acts are intended to fall within the scope of the instant disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A method of filtering a space-variant image, the method comprising:
receiving, at an image filter module, image data for the space-variant image;
receiving, at the image filter module, a target variance specified by a user, wherein the target variance establishes a filtered variance desired by the user to be exhibited by each of a plurality of pixels included in the space-variant image as a result of being filtered; and
with the image filter module, for each of the plurality of pixels included in the space-variant image:
(i) detecting a variance of the pixel, wherein the detected variance indicates a deviation of the image data for the pixel from a threshold;
(ii) generating a variance reduction power based on a relationship between the detected variance of the pixel and the target variance specified by the user;
(iii) selecting at least a first defined kernel from a database populated with a plurality of defined kernels that are available to be selected for filtering the image data for the pixel; and
(iv) recursively filtering the image data for the pixel during a plurality of filter iterations to cause the variance of the pixel to approach the target variance, wherein at least one of the filter iterations comprises applying the first defined kernel to the image data for the pixel.

2. The method of claim 1, wherein receiving the image data comprises receiving a quantity of radiation sensed by a plurality of sensors included in a detector array of a medical imaging modality.

3. The method of claim 1, wherein generating the variance reduction power comprises quantifying a reduction of the detected variance required to cause the detected variance to be approximately equal to the target variance, and wherein recursively filtering the image data comprises applying the first defined kernel selected from the database during more than one of the filter iterations to cause the variance of the pixel to approach the target variance.

4. The method of claim 1 further comprising, with the image filter module, for each of the plurality of pixels included in the space-variant image:
selecting a second defined kernel from the database, the second defined kernel being different than the first defined kernel; and
applying the second defined kernel to the image data for the pixel during a second filter iteration to further cause the variance of the pixel to approach the target variance, the second filter iteration being different than the at least one of the filter iterations during which the first defined kernel is applied.

5. The method of claim 4, wherein applying the first defined kernel and applying the second defined kernel cause different reductions of the variance of the pixel.

6. The method of claim 1, wherein selecting the first defined kernel from the database comprises selecting a square kernel comprising no more than five (5) rows and five (5) columns.

7. The method of claim 6, wherein the square kernel comprises no more than three (3) rows and three (3) columns.

8. The method of claim 6, wherein the square kernel is a box kernel comprising only kernel elements having a value of one (1).

9. The method of claim 1, wherein each of the plurality of defined kernels in the database is associated with a different variance reduction power, and wherein the first defined kernel is selected based on a relationship between a known variance associated with the first defined kernel and the variance reduction power.

10. The method of claim 1, wherein the image data for more than one pixel is recursively filtered using the first defined kernel.

11. A non-transitory computer-readable medium comprising computer-executable instructions that, when executed by at least one computer processor, cause a computing system comprising an image filter module to perform operations for filtering a space-variant image and creating a substantially uniform variance across a plurality of pixels collectively forming the space-variant image, the operations comprising:
receiving image data for the space-variant image;
receiving a target variance specified by a user, wherein the target variance establishes a filtered variance desired by the user to be exhibited by each of a plurality of pixels included in the space-variant image as a result of being filtered; and
with the image filter module, for each of the plurality of pixels included in the space-variant image:
(i) detecting a variance of the pixel, wherein the detected variance indicates a deviation of the image data for the pixel from a threshold;
(ii) generating a variance reduction power based on a relationship between the detected variance of the pixel and the target variance specified by the user;
(iii) selecting at least a first defined kernel from a database populated with a plurality of defined kernels that are available to be selected for filtering the image data for the pixel; and
(iv) recursively filtering the image data for the pixel during a plurality of filter iterations to cause the variance of the pixel to approach the target variance, wherein at least one of the filter iterations comprises applying the first defined kernel to the image data for the pixel.

12. The non-transitory computer-readable medium of claim 11, wherein the image data comprises receiving a quantity of radiation sensed by a plurality of sensors included in a detector array of a medical imaging modality.

13. The non-transitory computer-readable medium of claim 11, wherein generating the variance reduction power comprises quantifying a reduction of the detected variance required to cause the detected variance to be approximately equal to the target variance, and wherein recursively filtering the image data comprises applying the first defined kernel selected from the database during more than one of the filter iterations to cause the variance of the pixel to approach the target variance.

14. The non-transitory computer-readable medium of claim 11 further comprising instructions that, when executed, cause the image filter module to perform additional operations comprising, for each of the plurality of pixels included in the space-variant image:
selecting a second defined kernel from the database, the second defined kernel being different than the first defined kernel; and applying the second defined kernel to the image data for the pixel during a second filter iteration to further cause the variance of the pixel to approach the target variance, the second filter iteration being different than the at least one of the filter iterations during which the first defined kernel is applied.

15. The non-transitory computer-readable medium of claim 14, wherein applying the first defined kernel and applying the second defined kernel cause different reductions of the variance of the pixel.

16. The non-transitory computer-readable medium of claim 11, wherein selecting the first defined kernel from the database comprises selecting a square kernel comprising no more than five (5) rows and five (5) columns.

17. The non-transitory computer-readable medium of claim 16, wherein the square kernel comprises no more than three (3) rows and three (3) columns.

18. The non-transitory computer-readable medium of claim 16, wherein the square kernel is a box kernel comprising only kernel elements having a value of one (1).

19. The non-transitory computer-readable medium of claim 11, wherein each of the plurality of defined kernels in the database is associated with a different variance reduction power, and wherein the first defined kernel is selected based on a relationship between a known variance associated with the first defined kernel and the variance reduction power.

20. The non-transitory computer-readable medium of claim 11, wherein the image data for more than one pixel is recursively filtered using the first defined kernel.

\* \* \* \* \*

UNITED STATES PATENT AND TRADEMARK OFFICE
CERTIFICATE OF CORRECTION

PATENT NO. : 10,636,128 B2
APPLICATION NO. : 16/010666
DATED : April 28, 2020
INVENTOR(S) : Alexander Zamyatin It is certified that error appears in the above-identified patent and that said Letters Patent is hereby corrected as shown below:

In the Specification
Column 6, Line 47, change "(or four-centimeter (4-cm) ) col-" to --or four-centimeter (4-cm) col- --

Signed and Sealed this
Sixteenth Day of June, 2020

Andrei Iancu
*Director of the United States Patent and Trademark Office*